J. A. DIETERICH.
SPRING WHEEL.
APPLICATION FILED NOV. 12, 1908.

943,397.

Patented Dec. 14, 1909.
2 SHEETS—SHEET 1.

Witnesses:
Nathan F. Fretter
Brennan B. West

Inventor.
John A. Dieterich
By Bates, Fouts & Hull
Attys

J. A. DIETERICH.
SPRING WHEEL.
APPLICATION FILED NOV. 12, 1908.

943,397.

Patented Dec. 14, 1909.
2 SHEETS—SHEET 2.

Witnesses:
Inventor.
John A. Dieterich
By Bates, Fouts & Hull
Attys

UNITED STATES PATENT OFFICE.

JOHN A. DIETERICH, OF CLEVELAND, OHIO, ASSIGNOR OF ONE-HALF TO GEORGE BLUMENSTOCK, OF CLEVELAND, OHIO.

SPRING-WHEEL.

943,397.                Specification of Letters Patent.     Patented Dec. 14, 1909.

Application filed November 12, 1908.   Serial No. 462,191.

*To all whom it may concern:*

Be it known that I, JOHN A. DIETERICH, a citizen of the United States, residing at Cleveland, in the county of Cuyahoga and State of Ohio, have invented a certain new and useful Improvement in Spring-Wheels, of which the following is a full, clear, and exact description, reference being had to the accompanying drawings.

This invention relates to a spring wheel for use upon vehicles, and aims to produce a spring wheel which shall be simple in construction, durable and strong, and resiliently bear the weight of the vehicle and its contents, transporting the same over the road with a minimum of jarring effect.

Generally speaking, the invention comprises the elements and combinations thereof set forth in the accompanying claims.

Reference should be had to the accompanying drawings, in which—

Figure 1:
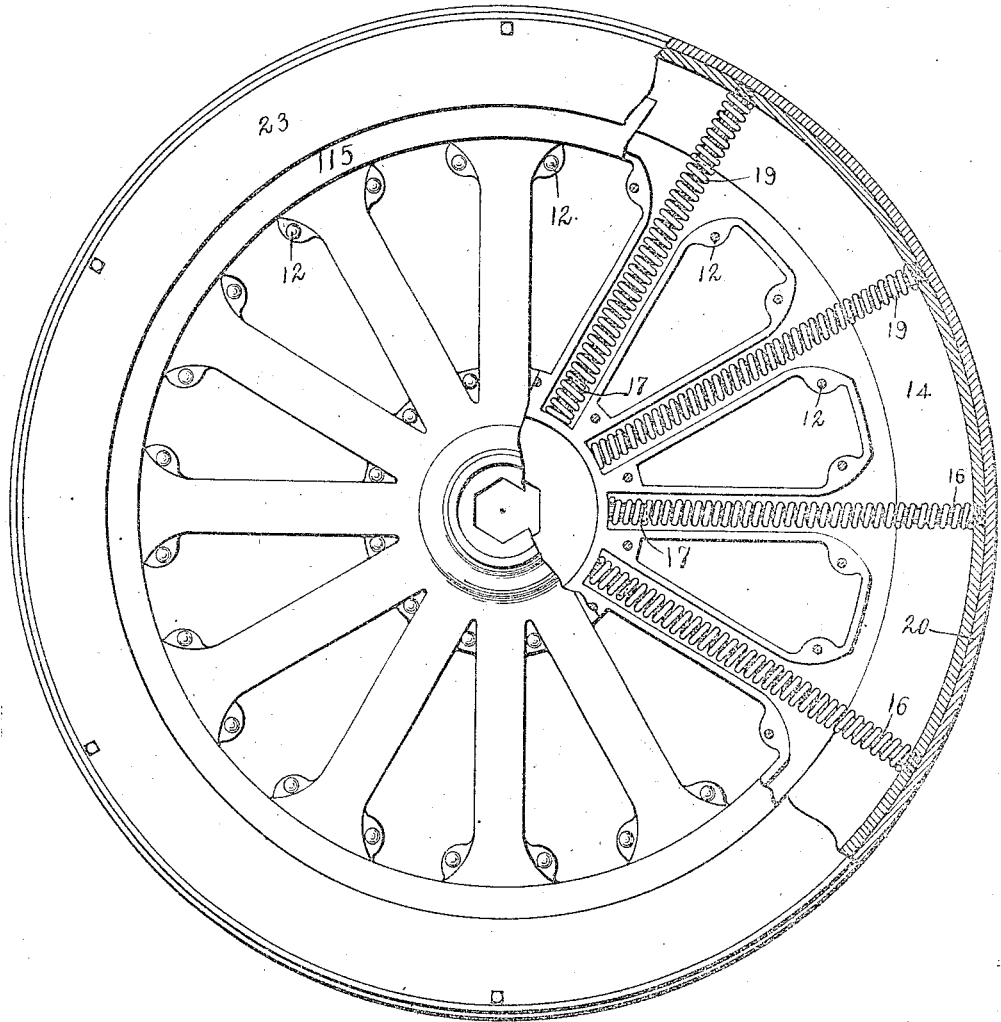
Figure 2:
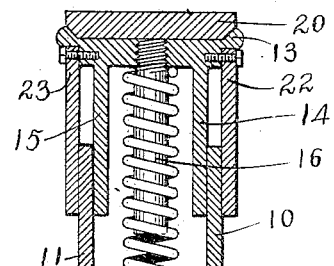
Figure 3:
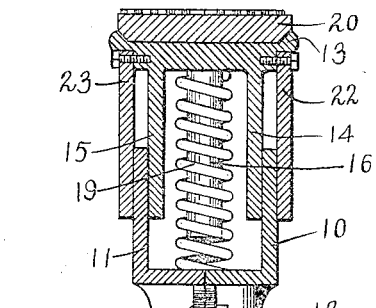
Figure 4:
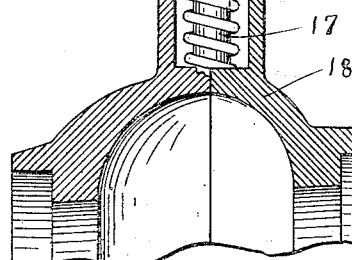
Figure 5:
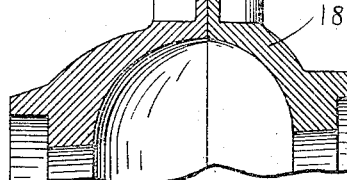

Figure 1 is an elevation of a spring wheel embodying the features of my invention, certain parts of the wheel being removed to more effectually disclose the internal structure; Fig. 2 is a vertical section through a spoke, hub and the tread; Fig. 3 is a section through the hub and tread between the spokes; Fig. 4 is a section through the tread illustrating the use of a rubber tire in connection with the wheel; and Fig. 5 is a fragmentary plan view of the tire shown in Fig. 3.

The hub and spoke portions of the wheel are formed of two symmetrical halves in the longitudinal direction of the wheel. These half portions may be formed of a single sheet of sheet metal either by single stamping or by a forging, or in any other manner, and it is also evident that the spokes and hub might be formed other than from a single sheet of metal.

The two symmetrical portions of the wheel are joined together by means of bolts and nuts 12 which engage the two halves of the wheel and hold the same together.

The spokes are tubular, and at their outer ends are all joined to two parallel annular flanges 10 and 11 which entirely encircle the wheel. The hub may also be made hollow which conduces to the reduction of the weight of the wheel.

The tread of the wheel is entirely independent of the spokes and is formed with a tire receiving portion 13 and two parallel depending flanges 14 and 15 which are spaced apart a sufficient distance so that their outer surfaces may engage the inner surfaces upon the flanges 10 and 11. To the portion 13 of the tread are secured a series of posts 16, which correspond in number to the spokes and are spaced apart a sufficient distance so that each post may be arranged opposite to a spoke and in alinement therewith. These posts 16 may be secured to the part 13 of the tread by screw threading the said posts, or they may be fastened in any suitable manner.

At the inner lower end of the spokes is secured a post 17 which is secured to either half portion of the hub 18.

Springs 19 occupy the space within the hollow spokes and at their outer ends encircle the posts 16 and at their inner ends encircle the posts 17. The springs are selected of a proper stiffness to be suitable for the class of vehicle upon which they are to be used. The springs when in assembled position in the wheel are under compression, which prevents any rattling of the parts.

The tread 13 of the wheel may be formed saucer shape, as will be evident from inspection of Fig. 2 for the purpose of engaging and holding a tire indicated at 20. This tire may be a plain steel band, as shown in Fig. 2, or it may be a steel band formed with projections upon the outer side thereof as indicated in Fig. 3, and shown with more detail in Fig. 5. Or, if desired, a rubber tire, as shown at 21, may be used.

The wheel will be complete and operative as above described, but in order to more effectually prevent dust from working its way into the interior of the spokes I secure annular dust strips 22 and 23 upon opposite sides of the tread, the said strips extending toward the hub of the wheel a sufficient distance to cover the upper edges of the flanges 10 and 11. These protecting members 22 and 23 are secured to the tread of the wheel by screw threaded bolts so that they are readily removable.

In assembling the wheel, one half of the hub and spoke portion is assembled in proper relation to the tread, the springs 19 are then inserted in place and the other half of the hub and spokes is assembled in its proper relation to the wheel and the halves of the hub and spokes are secured together by the bolts. The dust guards 22 and 23 are then placed in position and the desired form of tire placed upon the tread.

As before intimated, the springs 19 are selected to be of the proper stiffness to meet the requirements of the vehicle upon which the springs are to be used, stiffer and heavier springs being selected for use with vehicles which are themselves heavy. The springs are of sufficient rigidity so that the maximum load for which the vehicle is intended will not compress the springs to such an extent that the flanges 10 and 11 will engage the tread 13. In this way any bumping is obviated.

It is understood that the wheel herein shown and described is intended for use upon all classes of vehicles whether the said vehicles be for light road use or heavy trucking.

Having thus described my invention, what I claim is:

1. A spring wheel comprising a hub and a plurality of spokes, the hub and spokes being formed in symmetrical halves, the said spokes being hollow, when the halves are assembled, the outer end of the spokes being joined by parallel flanges, a tread portion coöperating with the flanges, said tread being capable of moving independently of the hub and spokes, springs within the spokes and extending throughout the length thereof, the outer ends of said springs being secured to the tread portion, the outer portions of the spokes being rounded, the said springs being deflected over said rounded portion when the wheel is in operation.

2. A spring wheel comprising a hub and a plurality of hollow spokes, the said hub and spokes being formed in two symmetrical halves and of a single piece of metal, the outer ends of the spokes being joined by parallel flanges, a tread portion coöperating with the flanges, said tread portion being capable of rotary movement independent of the hub and spokes, springs within the spokes and secured at their outer ends to the tread portion.

3. A spring wheel comprising a hub and a plurality of hollow spokes, the said spokes being joined at their outer ends by continuous webs forming flanges, the said hub and spokes being formed in two symmetrical halves formed from a single sheet of metal, a tread portion formed with depending flanges which coöperate with the flanges before mentioned, said tread portion being capable of rotary movement independent of the hub and spokes, springs within the hollow spokes and secured at their outer ends to the tread portion.

In testimony whereof, I hereunto affix my signature in the presence of two witnesses.

JOHN A. DIETERICH.

Witnesses:
  BRENNAN B. WEST.
  A. J. HUDSON.